Aug. 30, 1966　　　H. O. KNUDSEN　　　3,269,263
PHOTOGRAPHIC ENLARGER
Filed Dec. 6, 1963　　　　　　　　　　　　　2 Sheets-Sheet 1
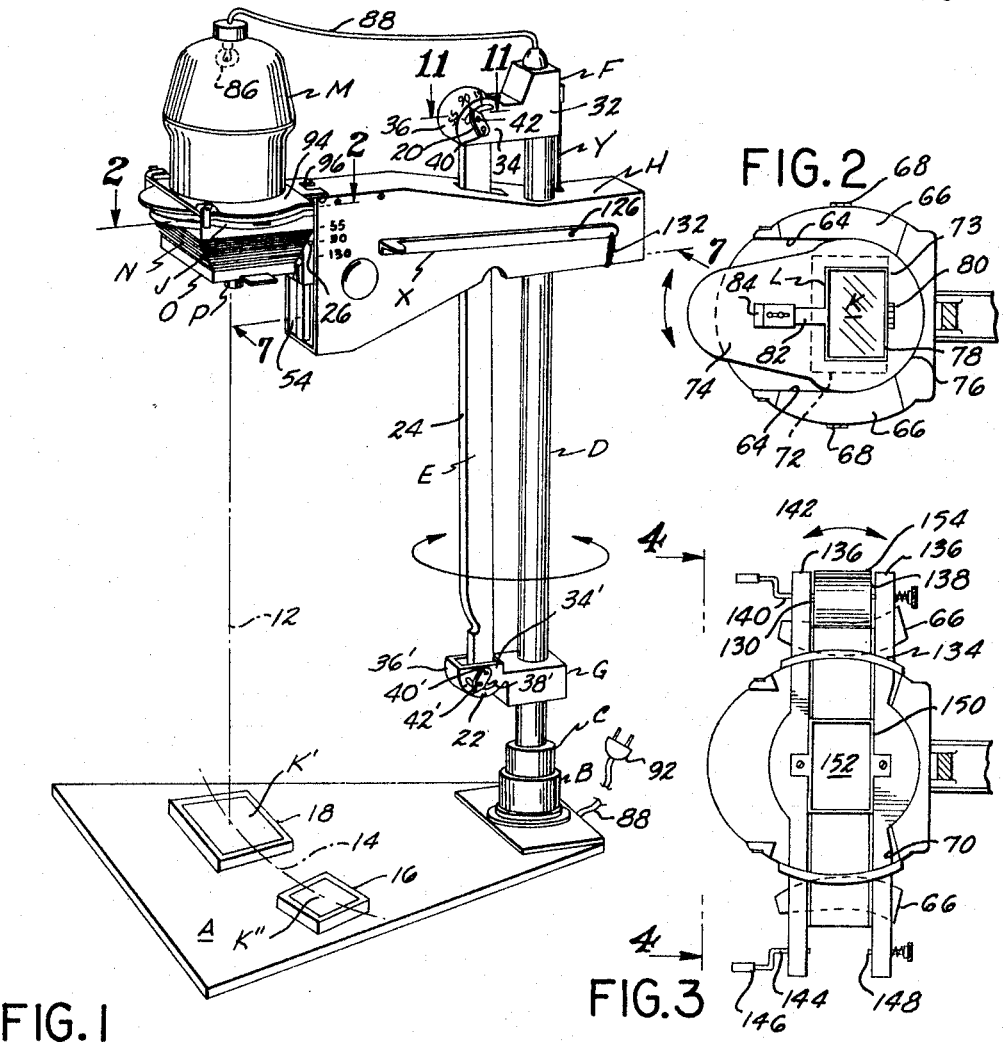
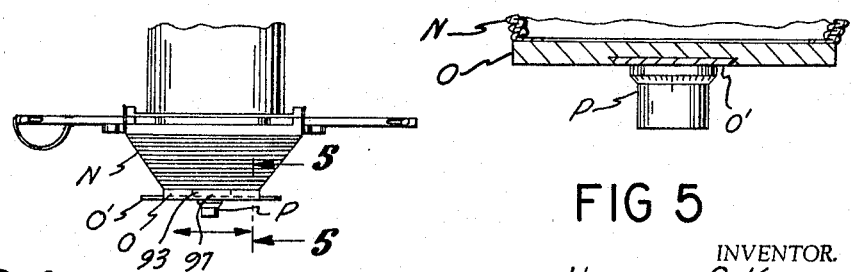
INVENTOR.
HJALMAR O. KNUDSEN
BY
William C. Babcock
ATTORNEY

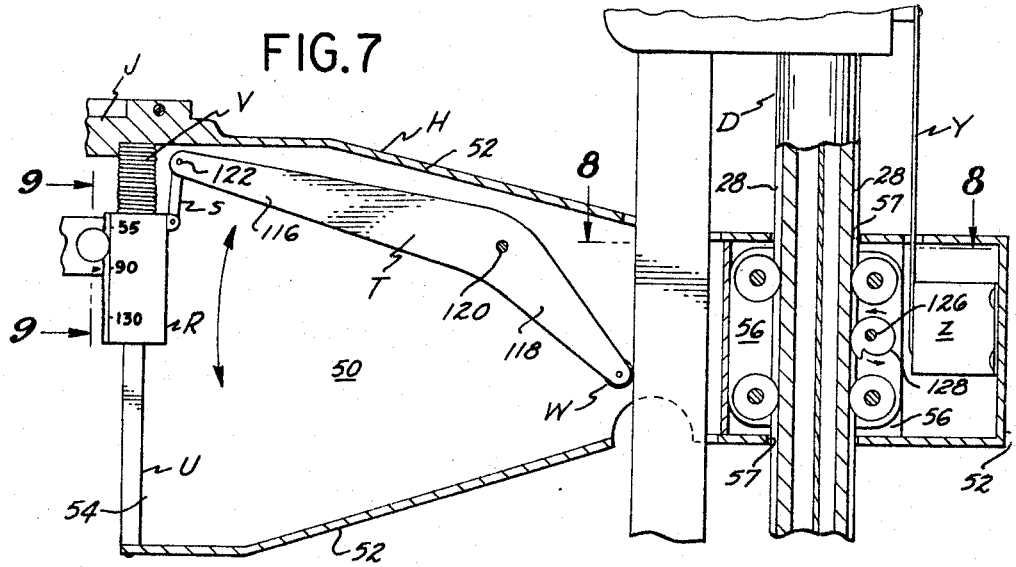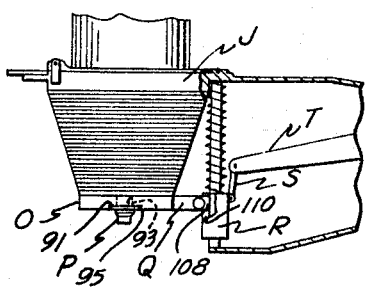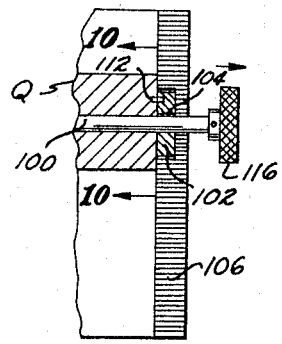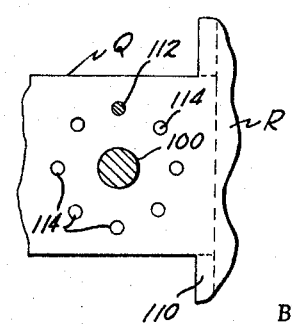

United States Patent Office 3,269,263
Patented August 30, 1966

3,269,263
PHOTOGRAPHIC ENLARGER
Hjalmar O. Knudsen, San Pedro, Calif.
(15112½ South Western Ave., Gardena, Calif. 90249)
Filed Dec. 6, 1963, Ser. No. 328,738
10 Claims. (Cl. 88—24)

The present invention relates generally to the field of photography, and more particularly to a new and improved photographic enlarger.

In commercial photography a succession of pictures are frequently taken on a roll of film of relatively small size, which at a later date are often found desirable to reproduce as photographs of substantially larger or smaller size. This is particularly true in the case of commercial juvenile photography, where a customer may order several photographs of wallet size, one or more of desk size, and a relatively large photograph of the portrait type. Heretofore development of photographs of various sizes from an exposed negative has been a slow and laborious process, requiring numerous adjustments to the photographic equipment, as well as a relatively high degree of skill on the part of the technician. The present invention is an enlarger, by means of which many of the difficulties previously encountered in the development of enlarged photographs are eliminated.

A major object of the present invention is to provide a photographic enlarger for use in commercial establishments where instead of moving large easels of the roll paper type to obtain a desired composition for printing, the easel is allowed to remain stationary, and the correction in composition attained by moving the lens support, pivoting the negative holder, or moving the head portion of the enlarger straight up or down.

Another object of the invention is to provide an enlarger that is extremely versatile in operation, as well as one that effects a distinct saving in time due to the complete elimination of the necessity for moving the easels.

A further object of the invention is to provide a photographic enlarger that is relatively simple in structure, easy to operate, and one that is adapted to receive developed film or transparencies of various sizes.

Yet another object of the invention is to provide an enlarger that can be utilized with full assurance that the enlarged image cast on the easel will be in true focus.

These and other objects and advantages of the invention will become apparent from the following description of a preferred form thereof, and from the accompanying drawings illustrating that form, in which:

FIGURE 1 is a perspective view of the photographic enlarger of the present invention;

FIGURE 2 is a fragmentary top plan view of a portion of the enlarger, taken on the line 2—2 of FIGURE 1;

FIGURE 3 is a fragmentary top plan view of a portion of an alternate form of the invention;

FIGURE 4 is a fragmentary side elevational view of a portion of the enlarger, taken on the line 4—4 of FIGURE 3;

FIGURE 5 is a fragmentary vertical cross-sectional view of the invention, taken on the line 5—5 of FIGURE 4;

FIGURE 6 is a combined fragmentary side elevational and vertical cross-sectional view of the upper forward portion of the invention;

FIGURE 7 is a fragmentary vertical cross-sectional view of a portion of the enlarger, taken on the line 7—7 of FIGURE 1;

FIGURE 8 is a horizontal cross-sectional view of a portion of the invention, taken on the line 8—8 of FIGURE 7;

FIGURE 9 is a combined fragmentary vertical cross-sectional and front elevational view of the enlarger, taken on the line 9—9 of FIGURE 7;

FIGURE 10 is an end elevational view of a portion of the invention, taken on the line 10—10 of FIGURE 9; and FIGURE 11 is a fragmentary transverse cross-sectional view of a portion of the enlarger, taken on the line 11—11 of FIGURE 1.

With continuing reference to the drawings for the general arrangement of the enlarger, it will be seen in FIGURE 1 to include a flat, heavy base A which may be of any desired configuration, on the rear end of which a tubular boss B is mounted that serves to rotatably support a cylindrical socket C, which in turn supports a tubular upright D. An elongate cam E is provided that extends upwardly between an upper cam support F and a lower cam support G mounted on upright D, with the cam being spaced forwardly therefrom.

A carriage H is vertically movable on upright D. A support J, best seen in FIGURES 6 and 7, projects from the forward upper end of carriage H in which an opening (not shown) is formed that may be brought into alignment with a negative or transparency K when mounted on a holder L such as shown in FIGURE 2. A light housing M (FIGURE 1) is hinged to the forward portion of carriage H, which when in use, rests on the support J in the position illustrated in FIGURE 1.

A bellows N depends from support J, the lower end of which is closed by two flat, rigid, laterally spaced members O that serve to slidably support a bar O' therebetween on which the enlarging lens P is mounted. A rearwardly extending rigid connector Q is affixed to member O, as shown in FIGURES 6, 9 and 10. Connector Q is vertically adjustable relative to a lens adjuster R that is pivotally connected by a link S to the forward end of a cam follower T, pivotally supported in carriage H, as shown in FIGURE 7.

Lens adjuster R is slidably mounted on a carriage-supported rod U, and is at all times urged downwardly relative thereto by a compressed helical spring V. Due to the force exerted thereon by spring V, cam follower T tends at all times to pivot in a counterclockwise direction, as illustrated in FIGURE 7, to maintain a roller W in contact with cam E.

A lever X is provided on one side of carriage H, (FIGURE 1) that operates a brake, later to be described in detail, which holds the carriage and the components associated therewith at any desired elevation on the upright D. The upper end of a flexible steel tape Y is affixed to the rear portion of the upper cam support F. This tape Y extends downwardly and is wound on a spring-loaded reel (not shown) inside a receptacle Z mounted on carriage H. The spring loading of the reel is just sufficient to balance the weight of the carriage H and components associated therewith, and because of this spring loading of the reel, the carriage H will not inadvertently fall upon the brake controlled by the lever X to place it in a non-braking position.

The present invention is adapted to enlarge or reduce the images on negatives or transparencies K of various sizes to any desired degree, and these enlarged or reduced images are cast on unexposed paper 10 of an appropriate size. In FIGURE 1 it will be noted that if a line 12 is directed downwardly through the center of the enlarging lens P, it will trace an arc of a circle 14 on the base A when the carriage H and the components associated therewith are rotated on upright D.

Easels 16 and 18 of conventional design (FIGURE 1), but capable of holding unexposed paper 10 of different sizes, are mounted on base A and centered on the circle arc 14. Although but two easels 16 and 18 are illustrated as being used with the enlarger, the device is in no sense limited thereto, for any number of easels may be used therewith. To permit maximum speed in using the enlarger, the easels 16 and 18 are preferably of the roll paper type.

Negatives K of different sizes are commonly employed in cameras used in commercial photography of such subjects as children and adults. The image on any one of these negatives K can, by the use of an appropriate lens P best seen in FIGURE 3, be projected as an enlarged or reduced light image on a desired one of the easels 16 or 18 by making an adjustment to the enlarger. Three lenses P are preferably employed, which are 55, 90 and 130 mm. in size, each of which is adapted for use with a negative falling within a known range of sizes.

The light housing M is of conventional design, and includes an electric bulb (not shown) that generates an intense light when it is directed downwardly as a beam through the negative K by means of a reflector (not shown) or a pair of condensing lenses (not shown).

If the negative K is of a size such that the 90 mm. lens P would be used to produce a light image which is an enlarged or reduced version of the image on the negative, the connector Q (FIGURE 7) is moved to a position where an arrow 19 or other indicia thereon is in horizontal alignment with a graduated line identified by the numeral 90 on lens adjuster R. A first pointer 20 (FIGURE 1) that is pivotally mounted on the upper cam support F is rotated until it is in registry with a 90 mm. graduation marked on the upper cam support. Likewise, a second pointer 22 on the lower cam support G is pivoted to a position where it is in registry with a 90 mm. graduation marked on the lower cam support. Adjustment of these two pointers 20 and 22 in this manner moves cam E to vary the angulation of the edge 24 thereof relative to the vertical. These three adjustments so position the cam E and the enlarging lens P relative to the negative K that when the lens is in the position shown in FIGURE 1, the image on the negative is cast in perfect auto focus for the full length of cam E.

It will be apparent that if the lens P, bellows N, negative K, light housing M and carriage H are concurrently lowered on upright D, the enlarged light image K' cast on one of the easels 16 or 18, or other easel, will become progressively smaller. When these components have been moved downwardly by manipulation of the brake lever X to a position where a light image K' is formed that is just sufficient in size to fill one of the easels, the brake lever is released, with the brake to be described hereinafter, holding the carriage H at this position in the upright D.

As the lens P and associated components are lowered on the upright D to decrease the size of the light image K', it is necessary to vary the distance betwen the lens and the negative K in order that the light image K' will be in true focus. This change of distance between the lens P and negative K is automatically effected as the carriage H is moved vertically on upright D by the cam edge 24 which is at such angulation as to pivot the cam follower T the requisite distance to effect the change. Cam edge 24, as seen in FIGURE 7, extends downwardly and outwardly at a slight angle relative to the vertical, and due to the force exerted by spring V on lens adjuster R, the roller W of cam follower R is in pressure contact with the cam edge at all times. As the roller W moves longitudinally along cam edge 24, the cam E pivots in the appropriate direction to either move lens P towards or away from negative K to assure that the light image K' cast on one of the easels is in true focus.

Changing the positioning of pointers 20 and 22 varies the angulation of the cam E and edge 24 thereof, so that the follower T will move the lens P relative to the negative K at a new rate to at all times maintain the enlarged image in true focus on the easel.

When a negative K of such dimensions as to require a 55 mm. lens P to produce an enlarged or reduced light image, the lens P on slide O' is unscrewed therefrom, and a 55 mm. lens screwed in place on the slide. Of course, if desired three slides O' could be provided, each carrying a different size lens P, and in that case one of the slides O' carrying the lens P of 55 mm. size substituted therefor.

After this substitution in size of lens P, the connector Q is moved to a position where the arrow 19 thereon is in horizontal alignment with the graduation line on lens adjuster R, which is identified by the numeral 55. Pointers 20 and 22 are manually manipulated to bring them into alignment with the graduation lines 55 on the upper and lower cam supports F and G. When the image on the negative K of a 130 mm. lens is to be enlarged, the same procedure is followed, but the pointers 20 and 22 are placed in registry with the graduation lines 130 on cam supports F and G, and the connector Q is moved to place arrow 19 in alignment with the graduation line 130 on lens adjuster R.

As to the detailed structure of the enlarger, the upright D is preferably formed from a heavy-walled metallic tube or pipe, and two grooves 28 extend longitudinally along opposite sides thereof, as can best be seen in FIGURES 7 and 8. Cam E comprises an elongate rigid member, in the end portions of which two transverse bores 30 are formed, one of which is shown in FIGURE 11.

Upper cam support F includes a body 32 that is rigidly affixed to the upper end of upright D. Two parallel, laterally spaced walls 34, the upper ends of which are arcuate, project forwardly from body 32, and a connecting wall 36 extends between walls 34. Transversely aligned, horizontally disposed slots 38 are formed in walls 34, and the first pointer 20 is pivotally supported on a pin or screw 40 (FIGURE 11) that projects from one of the walls 34.

A rod 42 projects from one end of pointer 20 that is movable in slots 38 and extends through the upper bore 30 in cam E. Threads 44 are formed on one end of rod 42 that are engaged by a wing nut 46. A washer 48 is mounted on rod 42 which is disposed between the wing nut 46 and one of the walls 34. When pointer 20 is pivoted on pin 40 to any one of the graduations 55, 90 or 130 on upper cam support F, the rod 42 and upper portion of cam E are shifted relative to the walls 34.

The lower cam support G includes a body 50 that is rigidly affixed to upright D in the position shown in FIGURE 1. Two walls 34' extend forwardly from body 50 that are of the same general structure as walls 34, but occupy inverted positions relative thereto. The structure of lower cam support G is substantially the same as that of the support F, and accordingly need not be described in detail.

Components of cam support G that are common to cam support F are identified in FIGURE 1 by the same numerals, but to which a prime has been added. The pins 40 and 40' do not lie in the same vertical plane, and accordingly, when the first and second pointers 20 and 22 are moved to the same graduations, say 55, and locked in position therewith by use of nut 46 and an identical lower wing nut (not shown), the forward edge 26 of the cam E is angularly disposed. This angulation of edge 26 is such that it is contacted by roller W when carriage H is moved upwardly or downwardly on upright D, the cam follower T will pivot to move the enlarging lens P relative to negative K to maintain the light image K' in focus when it is cast on the easel.

Carriage H, as may best be seen in FIGURES 1, 7 and 8, includes two parallel, laterally spaced side walls 50 that are connected on their side and rear edges by a continuous strip 52. Carriage H has an elongate forward open end 54, and the rod U extends between upper and lower portions of strip 52, slightly to the rear of this open end. Two longitudinally spaced rigid members 56 are supported inside carriage H by conventional means, and extend between side walls 50, as best shown in FIGURE 8. Vertically aligned openings 57 are formed in the upper and lower portions of strip 52 through which the upright D extends, as may be seen in FIGURE 7. Members 56 are disposed on opposite sides of upright D.

A vertical slot 58 is formed in that portion of each member 56 most adjacent to upright D. An upper and lower pair of rollers 60 are mounted in slots 58 that engage the grooves 28 in upright D to prevent rotation of carriage H relative to the upright. Each roller 60 is rotatably supported on a shaft 62 that spans one of the slots 58.

The support J projects from the upward forward portion of carriage H, as best seen in FIGURES 6 and 7. As illustrated in FIGURES 1 and 2, support J comprises a relatively thick plate, in the upper part of which a U-shaped first recess 64 is formed that extends rearwardly from the forward part thereof. Recess 64 is preferably partially defined by two wings 66 that are movable relative to support J by reason of hinges 68 connecting the wings thereto.

When the wings 66 are pivoted outwardly as shown in FIGURE 3, two transverse second recesses 70 are defined in the support J that communicate with the first recess 64. Wings 66 occupy the outwardly extending positions shown in FIGURE 3, only when the enlarger is modified to a first alternate form thereof. An opening 72 is formed in support J that extends downwardly therethrough from recess 64, and the area of this opening is as large as that of the largest negative K which will be enlarged by use of the present invention.

The holder L (FIGURE 2) is formed from an opaque piece of sheet material, and includes a rear portion 73 from which a handle 74 extends forwardly. Rear portion 73 has a generally semi-circular edge 76 which permits easy insertion of the holder L into the first recess 64 when the enlarger is being used in a darkened room. The curved edge 76 permits pivotal movement of holder L in recess 64, and when the holder L is pivoted it rotates the light image K' relative to one of the easels. By moving the lens support O' laterally, the light image K' can be shifted to a desired position on one of the easels 16 or 18 without moving the easels. The main purpose of pivoting the holder L and moving lens support O' is to obtain a light image K' of a desired composition on one of the easels in the most convenient manner, without the necessity of moving the easels.

A rectangular opening (not shown) is formed in holder L over which a negative K of a particular size may be extended for enlargement of the image thereon. A rectangular hollow frame 78 is pivotally supported on holder L by hinges 80. A handle 82 projects from frame 78 that may be removably locked with the upper surface of the holder by conventional means 84 shown in FIGURE 2. When the handle 82 is so locked, the frame 78 presses down on the sides of the negative K to firmly hold it in position on the upper surface of holder L.

Light housing M is of conventional design, as can be seen in FIGURE 1, and an incandescent bulb 86 is positioned in the upper portion thereof, from which an intense beam of light is directed downwardly when the bulb is energized. Electricity is supplied to bulb 86 by insulated conductors 88 that extend therefrom to the upper portion of body 32, and then downwardly through the body and upright D to emerge below the base A. The conductors 88 then extend to a pronged plug 92 that can be inserted in a domestic electrical outlet.

The lower end of light housing M is rigidly connected to the upper surface of a rigid sheet 94 in which an opening (not shown) is formed that is in vertical alignment with opening 72 when the sheet occupies the position shown in FIGURE 1. Sheet 94 is pivotally connected to the forward upper portion of carriage H by a hinge 96, and when this sheet is in the position shown in FIGURE 1, it rests on the upper surface of support J. The sheet 94 is removably held in the position shown in FIGURE 1 by clips 98, or other suitable fastening means.

Bellows N is connected at the upper end thereof to the support J, and the member O is affixed to the lower end of the bellows. The member O is shown in FIGURES 4 and 6 as flat opaque body, in the lower portion of which a slot 91 extends transversely and communicates with an elongate aperture 93 also formed in this member. The upwardly and outwardly tapering side walls 95 of slot 91 slidably support complementary edge surfaces of the elongate lens support O'. Support O' is opaque and an opening 97 is formed therein that is in vertical alignment with lens P. Lens P is affixed to support O' by conventional means.

If desired, one support O' may be provided, with each of the enlarging lens P used, being removably mountable thereon. However, three or more supports O' may be provided, each carrying a different sized lens P, and the supports O' are interchangeably mountable on member O to provide a lens of a desired size. By moving one of the lens supports O' laterally relative to member O, the lens P is moved lengthwise relative to elongate aperture 93 and the light image K' shifted relative to one of the easels 14 or 18 without moving the easels.

Should it be desired, the member O may be defined by two elongate, opaque, spaced bodies (not shown) that slidably support the lens support O' therebetween. The rear end of member O develops into the connector Q, from the rear of which a shaft 100 is rotatably supported in a transverse position. A pinion 102 is rigidly affixed to shaft 100 by a key 104, and this pinion engages a vertically extending rack 106 mounted on the forward face of the lens adjuster R.

A wedge-shaped tongue 108 extends rearwardly from connector Q (FIGURE 6) that slidably engages a vertical groove 110 of complementary shape formed in the forward portion of lens adjuster R. This tongue and groove arrangement permits vertical adjustment of the connector Q, member O, and lens P relative to lens adjuster R, but prevents forward or rearward movement of the connector relative to the lens adjuster.

A peg 112 is provided on pinion 102 that projects from the inner face thereof, as can best be seen in FIGURE 9. A number of circumferentially spaced recesses 114 (FIGURE 10) are formed on the face of connector Q most adjacent to pinion 102. Recesses 114 are arranged in a circle of such radius that any one of them can be engaged by the peg 112 when the pinion 102 is rotated to a position where the peg is in alignment therewith.

To vertically adjust the lens adjuster R relative to connector Q, member O, and lens P, the shaft 100 is pulled outwardly slightly by use of a knurled circular handle 116 provided on the outer end thereof and the shaft then rotated. Pinion 102 is, of course, rotated concurrently with shaft 100, and as the pinion is rotated, the connector Q is moved vertically relative to the lens adjuster R, due to the engagement of the pinion with rack 106. After the desired vertical adjustment has been made between lens adjuster R and connector Q, the shaft 100 is moved inwardly to place the peg 112 in one of the recesses 114. The connector Q and lens adjuster R are then removably locked together.

As previously mentioned, an arrow 26 is imprinted on the rear portion of connector Q. The vertical adjustment just described is normally utilized to bring the arrow 26 into alignment with one of the graduation lines 55, 90 or 130 defined on the carriage H, as shown in FIGURE 1.

The cam follower T is preferably formed from two laterally spaced, parallel elongate members, each of which has a first leg 116 and a second shorter leg 118 that is angularly disposed relative to the first leg. A shaft 120 (FIGURE 7) extends transversely through the cam follower T, which is supported between the two side walls 52 of carriage H. The forward ends of the first legs 116 are connected by a transversely positioned pin 122, to which link S is pivotally connected.

The rear ends of legs 118 are connected by a transversely positioned shaft 124 that serves to rotatably support roller W. The brake lever X is connected to a shaft 126 that is transversely disposed relative to the side walls 52 of carriage H, and rotatably supported in bores (not shown) formed therein. Shaft 126 supports a cam member 128, best seen in FIGURE 7.

Cam member 128 is of such configuration that it is not in engagement with the upright D when a helical spring 132 holds the lever X in the position shown in FIGURE 1. When the lever X is held in the position shown in FIGURE 1 by a tensioned helical spring 132, the cam member 128 is forced into frictional engagement with the upright D, which assures that there will be no relative movement between the carriage H and the upright until a manual force is applied to the carriage to move it vertically on the upright.

When it is desired to move the carriage H on upright D, the handle X is pivoted in a counter clockwise direction, as shown in FIGURE 1, to move the cam 128 out of frictional contact with the upright, whereby it is possible to move the carriage vertically on the upright. The carriage H will not suddenly move downwardly when the handle X is moved to a non-braking position, due to the tape Y and the spring-loaded reel 138 in the container Z which prevents such action.

The use and operation of the enlarger has previously been described in detail and need not be repeated.

An alternate form of the invention is shown in FIGURE 3, which includes a frame 134 that rests on the upper portion of the support J. Two parallel laterally spaced side members 136 are provided that extend through the second recesses 70 when the wings 66 are pivoted outwardly to the position shown in phantom line. A reel 138 of conventional design is rotatably supported on a shaft 140, which is journaled in one of the end portions of the two side members 136 and is provided with a crank 142 to rotate the shaft and reel.

A second reel (not shown) may be removably mounted between a shaft 144 having a crank 146 and a spring-loaded pin 148 that are mounted on opposing ends of the members 136. A rectangular cage 150 is provided near the center of the two members 136, and this case defines an opening 152 therebetween. An elongate strip of film 154 is wound on the reel 130 and sequentially moved across opening 152 to permit enlargement of the image in each frame. Intermittent movement of the film 154 to place each frame thereof in alignment with the opening 152 is accomplished by actuation of the crank 146 to rotate the reel (not shown) on which the film is wound after enlargement of the images on each frame, by the same procedure described in connection with the preferred form of the enlarger. When it is desired to use the enlarger in the manner of the preferred form, the light housing M is pivoted upwardly and the negative holding device removed therefrom, whereby the wings 66 may be thereafter pivoted upwardly to occupy the position shown in FIGURES 1 and 2. The light housing M is then moved back to the position shown in FIGURE 1 and the enlarger is used in the manner first described.

From the previous description of the invention it will be seen that it is particularly adapted to be almost exclusively employed. In the past, it has been common practice to move these large easels in different directions to obtain the proper composition for printing, which is a time-consuming operation and lowers the production output of the plant. The enlarger of the present invention allows an operator to leave the easels in fixed positions and make all of the corrections and changes in composition by sliding the lens support O' to move the light image K' from right to left or vise versa, and by adjusting the negative holder L.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:
1. A photographic enlarger for reproducing an image from any one of a plurality of negatives of different sizes as an enlarged light image of any desired magnification or reduction on an unexposed photographic paper, including:
   (a) a base;
   (b) an upright rotatably supported on said base;
   (c) an elongate cam;
   (d) upper and lower cam supports;
   (e) first and second means on said upper and lower cam supports for adjustably supporting the upper and lower ends of said cam to permit the same to occupy any one of a plurality of angular positions relative to said upright;
   (f) a hollow carriage movably mounted on said upright;
   (g) a support projecting forwardly from an upper portion of said carriage, said support having a recess formed in the upper portion thereof that extends rearwardly from the forward edge thereof, and a downwardly extending opening which communicates with said recess;
   (h) negative holding means insertable in said recess for holding one of said negatives over said opening;
   (i) light generating means which directs a beam of light downwardly through said negative in said holding means and through said opening in said support;
   (j) a bellows supported from the lower end of said support;
   (k) an enlarging lens;
   (l) an opaque support for said lens that is connected to the lower end of said bellows and supports said lens in vertical alignment with said opening;
   (m) a lense adjuster vertically movable in the forward interior portion of said carriage;
   (n) third means for slidably connecting said lens support to said lens adjuster;
   (o) fourth means for varying the vertical distance of said lense adjuster relative to said third means and lens support;
   (p) a cam follower pivotally supported in said housing;
   (q) fifth means for pivotally connecting a forward end portion of said cam follower to said lens adjuster;
   (r) a roller rotatably supported on a rear end of said cam follower that at all times contacts a forward edge of said cam; and
   (s) spring means which at all times tend to move said lens adjuster downwardly to maintain said roller in contact with said cam, said first and second means and said fourth means capable of being manually adjusted to so space said lens relative to said negative that said beam of light casts a light image of said image on said negative in said holder onto a surface occupying a fixed position relative to said base, and on which surface said unexposed paper can be disposed, with said light image being maintained in true focus as said carriage is moved upwardly or downwardly on said upright when said cam follower pivots said cam to vary the distance between said negative in said holder and lens as such movement of said carriage takes place.

2. An enlarger as defined in claim 1 which further includes means for counterbalancing the weight of said carriage, light generating means, bellows, support and lens support on said upright.

3. An enlarger as defined in claim 1 which further includes a manual brake for holding said carriage at any desired elevation on said upright between said upper and lower cam supports.

4. An enlarger as defined in claim 1 wherein said first and second means include first and second pointers, each of which are manually adjustable for placement in registry with any one of a number of graduations on said upper and lower cam supports to indicate the positioning of said cam for a negative of a particular size.

5. An enlarger as defined in claim 1 which further includes indicia on said third means and a plurality of spaced graduations on said carriage, which indicia when in registry with one of said graduations indicates that said lens adjuster and third means have been moved relative to one another by said fourth means to vary the distance between said lens and said negative to obtain an enlarged light image of a particular size.

6. An enlarger as defined in claim 1 wherein said light holding means comprises a flat sheet having a curved forward end portion that is easily insertable in said recess, with said sheet having an opening formed therein, and a frame movably supported thereon for holding a negative of a particular size over said opening, with said recess in said support being of U-shaped configuration to receive said sheet.

7. An enlarger as defined in claim 6 wherein said light generating means comprises a housing pivotally supported from said carriage above said recess and capable of being disposed directly above said support, and an incandescent bulb in said housing for directing a beam of light downwardly towards said support in longitudinal alignment with said opening therein.

8. A device as defined in claim 1 wherein said third means comprises a connector that extends rearwardly from said lens support, which connector has engageable means on the rear end thereof that engage engaging means on the forward portion of said lens adjuster, with said engageable and engaging means holding said lens adjuster and connector in fixed horizontal relationship by permitting vertical movement of said connector relative to said lens adjuster.

9. An enlarger as defined in claim 8 wherein said fourth means includes a transverse shaft rotatably supported in said connector, a pinion rigidly affixed to a projecting end portion of said shafts, and a peg projecting inwardly from said pinion, with said peg capable of engaging any one of a plurality of recesses formed in said connector that are in circumferentially spaced relationship, a rack extending vertically on the forward face of said lens adjuster that is engaged by said pinion, and a handle for rotating said shaft, with said shaft and said pinion when slid outwardly from said connector to disengage said peg from one of said recesses moving said connector vertically relative to said lens adjuster until a desired positioning of said connector relative to said lens adjuster has been obtained, with said handle, shaft and pinion then being adapted to be moved inwardly to dispose one of said pegs in one of said recesses to hold said lens adjuster and connector in fixed vertical spaced relationship.

10. An enlarger as defined in claim 1 which further includes a vertical rod mounted in the forward portion of said carriage and on which said lens adjuster is slidably mounted, and said spring means comprises a compressed helical spring which encircles said rod and abuts against the upper surface of said lens adjuster and the upper interior surface of said carriage.

References Cited by the Examiner
UNITED STATES PATENTS 2,813,454 11/1957 Simmon _____ 88—24
2,985,066 5/1961 Hauptvogel et al. _____ 88—24

NORTON ANSHER, *Primary Examiner.*